(12) United States Patent
Gorbell

(10) Patent No.: US 6,805,990 B2
(45) Date of Patent: Oct. 19, 2004

(54) FLAT PLATE FUEL CELL STACK

(75) Inventor: Brian Gorbell, Calgary (CA)

(73) Assignee: Fuelcell Energy, Ltd., Calgary (CA)

( * ) Notice: Subject to any disclaimer, the term of this patent is extended or adjusted under 35 U.S.C. 154(b) by 122 days.

(21) Appl. No.: 10/065,476

(22) Filed: Oct. 22, 2002

(65) Prior Publication Data
US 2003/0077500 A1 Apr. 24, 2003

Related U.S. Application Data
(60) Provisional application No. 60/319,052, filed on Jan. 2, 2002, and provisional application No. 60/330,524, filed on Oct. 24, 2001.

(51) Int. Cl.[7] .............................. H01M 8/02; H01M 8/04
(52) U.S. Cl. ........................................ 429/35; 429/38
(58) Field of Search ...................... 429/35, 38

(56) References Cited

U.S. PATENT DOCUMENTS

2002/0068212 A1 * 6/2002 Osenar et al. ................ 429/36
2003/0077500 A1 * 4/2003 Gorbell ........................ 429/35
2003/0082427 A1 * 5/2003 Prasad et al. ................. 429/34
2003/0096153 A1 * 5/2003 Osenar et al. ................ 429/35

FOREIGN PATENT DOCUMENTS

| DE | 4324181 | 3/1994 | |
|---|---|---|---|
| WO | WO 99/54131 | 10/1999 | |
| WO | Wo02/43173 A1 * | 5/2002 | ............ H01M/8/02 |

* cited by examiner

Primary Examiner—Mark Ruthkosky
(74) Attorney, Agent, or Firm—Bennett Jones LLP

(57) ABSTRACT

A fuel cell unit includes a cassette holder for a ceramic fuel cell element sandwiched between interconnects of a novel design. The cassette holder isolates the cell from the surrounding interconnect by means of a pliant seal within a rigid frame, thereby reducing the possibility of breakage of the brittle cells. The cassettes are assembled between an upper and lower interconnect to isolate the upper face of the cell from the lower face of the cell. A fuel cell unit includes an upper and lower interconnect containing a cassette. A fuel cell stack is formed from a plurality of fuel cell units.

11 Claims, 3 Drawing Sheets

FLAT PLATE FUEL CELL STACK

CROSS REFERENCE TO RELATED APPLICATIONS

This application claims the priority benefit of U.S. Provisional Application No. 60/330,524 filed on Oct. 4, 2001 and U.S. Provisional Application No. 60/319,052 filed on Jan. 2, 2002, the contents of each are incorporated herein by reference.

BACKGROUND OF INVENTION

The present invention relates to novel solid oxide fuel cell units and a fuel cell stack formed from such units.

In a solid oxide fuel cell, oxidant and fuel are electrochemically reacted without burning to produce electricity directly. The reactants are supplied to the cell through manifolds and channels that direct reactants to the appropriate sides of a solid ceramic membrane that acts as an electrolyte.

A conventional planar fuel cell stack is made from a plurality of interleaved ceramic membranes and interconnect plates which act as barriers between the anode of one cell and the cathode of the adjacent cell. Each individual interconnect plate is sealed to adjacent interconnect plates, and in addition each fuel and oxidant manifold within the interconnect plate is individually sealed. The seals are necessary to prevent mixing of fuel and oxidant gases. If the integrity of the stack is not maintained, the seals may leak and allow fuel and oxidant to mix. Because the fuel cell typically operates above the autoignition temperatures of the fuel gases, a fuel leak may be disastrous. As a result, the fuel cell stack must be painstakingly assembled to ensure the integrity of all the seals between the interconnect plates and fuel cell elements.

The high operating temperature of solid oxide fuel cells in excess of 600° C., limits the selection of materials available for use as an interconnect. These materials must be able to withstand this temperature, and to simultaneously withstand an oxidizing environment on one side of the interconnect, and a partial reducing environment on the other. The material is also required to simultaneously maintain good electrical conductivity to collect the current generated by the cells. Most prior art interconnects have used ceramic materials and composites, however these materials demonstrate inferior electrical conductivity as compared to metals, and typically are not successful in withstanding both oxidizing and reducing environments simultaneously. Ceramic materials also are expensive to purchase as raw materials, require moulding or other processing, and then firing or sintering. These steps are all labour intensive and require significant amounts of time to process. In addition, a solid oxide fuel cell stack requires fine tolerances which are difficult to maintain when a green ceramic is sintered. Further, ceramic materials are brittle, and there can be significant losses during production due to handling and processing damage that occurs in the manufacture of the interconnect. Ceramic materials are also vibration and shock intolerant, which makes them unsuitable for applications where these factors are present, such as in automobiles.

Metallic interconnects which are machined from solid metal plates are known but are difficult to manufacture and as a result are expensive. There have been attempts to form metallic interconnects by bonding stacked metal plates together however such attempts have not been successful because of leaks forming between the metal plates and their inability to withstand the operating temperatures of solid oxide fuel cells. For example, U.S. Pat. No. 3,484,298 discloses a laminated electrode backing plate which is laminated using adhesives or other bonding agents. Further, in the prior art, the cells are held in place next to metal interconnect plates by thin inorganic seals, often alumina felts. These felts are quite thin, and require the cells and interconnect to be held together under compression to form an effective seal to prevent the fuel and oxidant gasses from leaking out of the assembled fuel cell stack. It is difficult to apply a compressive force using a mechanism entirely inside the hot zone, due to creep of materials at such elevated temperatures. It is essential that this compression means apply uniform force to the stack, and not exceed a threshold value, otherwise the brittle ceramic cells will crack, resulting in a failed stack assembly.

Prior art fuel cell interconnects have had to be constructed with exotic materials and construction techniques to maintain the stacks seal integrity, and thus have been difficult and expensive to manufacture. Prior art interconnects have had very fine tolerances, and have required many labour intensive steps to be made into a fuel cell stack. This had prohibited their use in mass produced applications.

Accordingly, there is a need in the art for a method of sealing the ceramic cells and stacking them with interconnect, such that the difficulties of assembly and integrity of a seal can be mitigated, whilst providing a means of shock isolation, such that the difficulties of using a brittle cell element can be minimized.

SUMMARY OF INVENTION

The present invention relates to a novel fuel cell unit including a cassette holder for a ceramic fuel cell element sandwiched between interconnects of a novel deign and also relates to the fuel cell stack formed by the novel fuel cell units. The cassette holder isolates the cell from the surrounding interconnect by means of a pliant seal within a rigid frame, thereby reducing the possibility of breakage of the brittle cells.

Accordingly in one aspect of the invention, the invention comprises fuel cell unit apparatus comprising:

(a) an upper interconnect comprising a top plate and a lower plate enclosing a sealed interior chamber and defining an intake and an exhaust manifold opening in fluid communication with the chamber, wherein the lower plate defines a cell opening;

(b) a lower interconnect comprising a lower plate and an upper plate enclosing a sealed chamber defining an intake and an exhaust manifold opening in fluid communication with the chamber, wherein the upper plate defines a cell opening;

(c) a fuel cell cassette comprising:
(i) a single planar fuel cell element having an anode surface, a cathode surface and an edge surface;
(ii) a resilient seal element which contacts both flat surfaces and the edge surface; and
(iii) a frame that retains both the seal and the ceramic cell element; wherein the fuel cell cassette fits within the upper interconnect cell opening and mates with the upper interconnect to seal the upper chamber and the fuel cell cassette fits within the lower interconnect cell opening and mates with the lower interconnect to seal the lower chamber; and (d) seal means disposed between the upper and lower interconnects.

In one embodiment, interconnects may preferably be substantially rhomboidal in shape with a square central portion and two outwardly projecting manifold portions on opposite sides of the central portion. In one embodiment, the cassette frame is comprised of an upper and a lower portion that are joined to retain the seal in place between the two portions. In one embodiment the seal is made from a flexible resilient material and in another the seal comprises a matrix of ceramic fibres. It is anticipated that the fibres could comprise alumina, zirconia or combinations of both, In a further embodiments, the seal further comprises a ceramic powder that could be zirconia powder or alumina powder or a combination of both.

In another aspect of the invention, the invention comprises a fuel cell stack which is formed from a stacked plurality of the fuel cell units described above.

BRIEF DESCRIPTION OF DRAWINGS

The invention will now be described by way of exemplary embodiments with reference to the accompanying simplified, diagrammatic, not-to-scale drawings. In the drawings.

DETAILED DESCRIPTION

The present invention comprises a fuel cell unit (30) which includes cassette holder (10) enclosing a ceramic fuel cell element (12) enclosed between interconnects (32, 34) of novel design.

Figure 1:
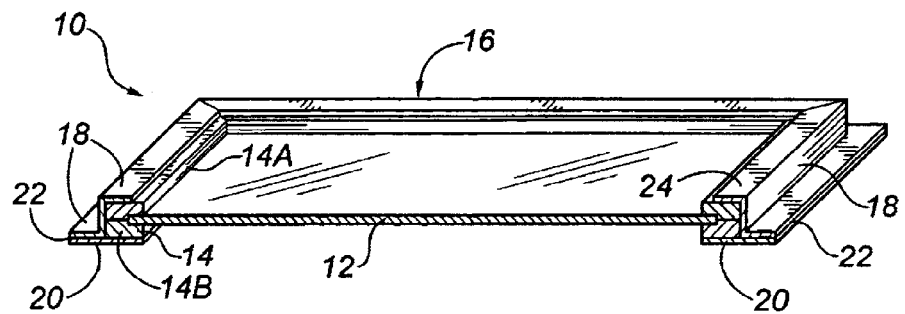
FIG. 1 shows a cross-section of one embodiment of the cassette holder.

In FIG. 1, a cassette holder (10) for a ceramic fuel cell element (12) is illustrated. A ceramic fuel cell element (12) is planar and peripherally surrounded by a resilient seal material (14). The fuel cell element (12) is preferably an anode supported planar element as is well known in the art and comprises a relatively thick anode layer, an electrolyte layer and a cathode layer. The seal (14) material is preferably thicker than the thickness of the ceramic fuel cell element and is used to both seal the edge of the ceramic fuel cell element (12), and to provide a cushion to absorb shocks that the cell element (12) might be exposed to. Any suitable seal material may be used. Preferably, the seal material may be a ceramic felt made from alumina, such as the Kaowool™ felt available from Kaowool Corporation, Augusta, Ga. Preferably, the ceramic felt is impregnated with ceramic particles as is described in co-pending U.S. patent application Ser. No. 09/931,415 filed Aug. 17, 2001, entitled High Temperature Gas Seals, the contents of which are incorporated herein, to improve its sealing ability.

The fuel cell element (12) requires fuel, usually hydrogen, to be present on one face, and an oxidant, usually air on the other face. Since the fuel cell (30) operates above the autoignition temperature of the fuel, it is very important that the fuel and oxidant streams be isolated from each other. The seal (14) may be formed from two identical seal members (14A, 14B) the outside dimensions of which are larger than the fuel cell element (12) and the inside dimensions of which are smaller than the fuel cell element (12). Thus the seal (14) receives the fuel cell element (12) between the two identical seal members (14A, 14B), as is illustrated in FIG. 1. Thus, because the seal members (14A, 14B) are resilient, the fuel cell element's (12) edge is receivingly engaged between the seal members (14A, 14B). This configuration seals the edges of the cell element (12) and prevents leakage of the operating fuel and oxidant gasses from one side of the cell element (12) to the other. The seal also provides a gas tight seal between the metal frame (16) and the cell element (12).

In another embodiment, it is possible to use a single seal member having an appropriate thickness and which has a horizontal channel cut into it, allowing the cell element (12) to be inserted into its thickness, as an equivalent to the combination of two identical seal members (14A, 14B) as illustrated in FIG. 1. Alternatively, a single seal member may be wrapped around the edge of the cell element (12) to create an equivalent seal.

In one embodiment, the frame (16) is fabricated from two different shaped parts, an upper bent portion (18), and a lower flat portion (20). These two portions are welded together, or otherwise bonded together by a suitable process, to form a flange (22). The gap formed between the lower flat portion (20) and the retaining lip (24) of the bent portion (18) should be smaller than the uncompressed thickness of two seal elements (14A, 14B). The width of the retaining lip (24) may also be less than the width of the seal elements so that a portion of the seal (14) extends out from underneath the frame (16) and is exposed.

The resultant cassette (10) also provides the mechanical clamping force to ensure a good seal between the frame (16) and the ceramic cell element (12). The clamping force generated by the joining of the upper (18) and lower (20) portions of the frame (16) also reduces the clamping force required on the overall fuel cell stack. Prior art fuel cell stacks require large amounts of clamping force to compress the assemblage of cells, seals and interconnects, and this is difficult to attain without the danger of cracking the ceramic cells. In addition, it is difficult to achieve large clamping forces within the hot zone, due to creep of materials at the elevated temperature found in operation of fuel cells.

The frame (16) may be made from a suitable metal, such as stainless steel, nickel-based alloys such as Inconel™, or other alloys that can withstand the extreme operating environment required from an SOFC. The frame (16) provides a structure for the fuel cell element (12), such that it can easily be incorporated into an interconnect, and also allows an individual fuel cell to be changed in the event of failure without the necessity of dismantling the entire fuel cell stack, as prior art designs require.

The cassette design also allows the integrity of each individual cell's sealing system, and the cell's electrical performance to be tested before inclusion in a fuel cell stack. This will result in a higher yield for stack production, as previous variables of seal effectiveness are eliminated. The seals (14) are preferably thicker than the cell element (12) allowing any irregularities in the ceramic cell (12) to be absorbed by the seal, and mitigates any potential gas leaks that could arise due to surface irregularities in the ceramic cell (12). The frame (16) also allows the cell (12) to be handled easily without damage, as the ceramic cell (12) is isolated from shock and vibration by the resilient seal (14).

Figure 2:
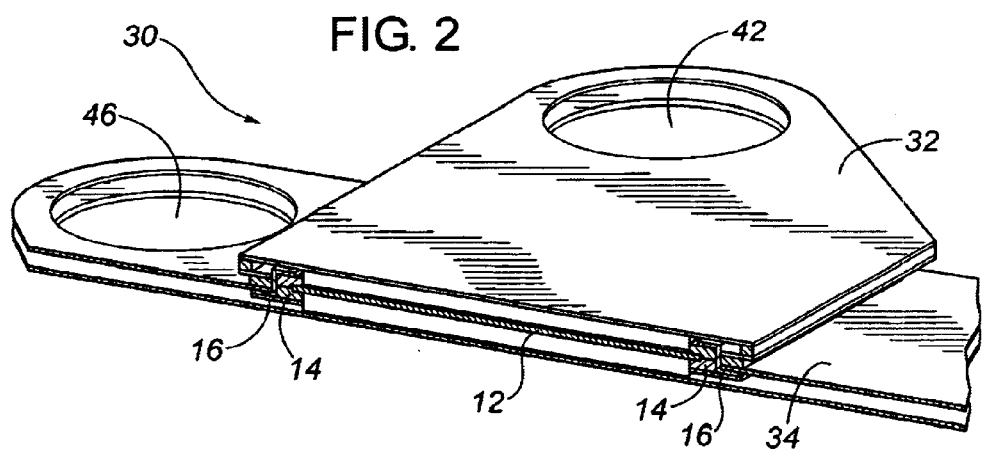
FIG. 2 shows a cross sectional view of a pair of interconnects as they would be mated to form a single cell in the fuel stack.

FIG. 2 shows a cross sectional view of a pair of interconnects as they would be mated to form a single cell in a fuel cell stack. Each individual unit (30) of the fuel cell stack includes an upper interconnect (32) and a lower interconnect (34). Each interconnect encloses an interior chamber for carrying one of the fuel or oxidant gas which flows through the fuel cell unit (30). In the embodiment illustrated and described, the upper interconnect (32) carries fuel gas, while the lower interconnect (34) carries oxidant gas.

Figure 3:
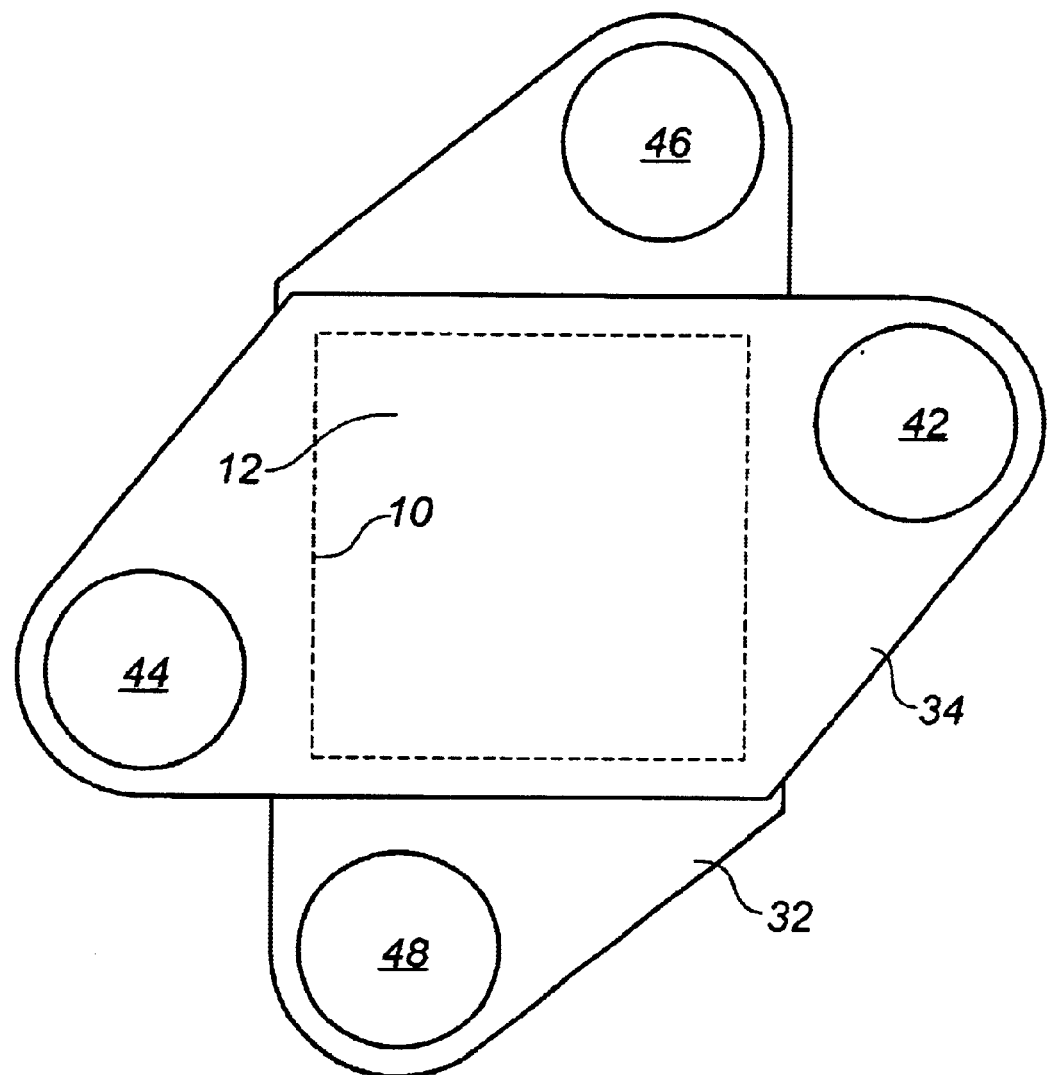
FIG. 3 shows a schematic top view of the interconnects as they would be positioned in a fuel stack.

FIG. 3 shows a schematic top plan view of the interconnects (32, 34) as they would be positioned in the fuel stack. The upper interconnect (32) defines a fuel intake manifold (42) and a fuel exhaust manifold (44) in the non-overlapping portion. The lower interconnect (34) similarly defines an oxidant intake manifold (46) and an oxidant exhaust manifold (48). When fuel cell units (30) are stacked together, each of these manifolds are aligned with corresponding manifold of the adjacent unit. With appropriate seals (not shown), a vertical cylindrical manifold is formed. Of course, the manifolds need not be circular as illustrated, however, a circular shape promotes smooth gas flow and is relatively easy to manufacture.

When the units (30) are stacked together, the manifold seals between adjacent units must be of sufficient thickness to bridge the gap between the manifold portions of each interconnect. Resilient seals as described above are again suitable with or without the use of rigid spacer rings which may be welded or otherwise attached to the interconnects.

Figure 4:
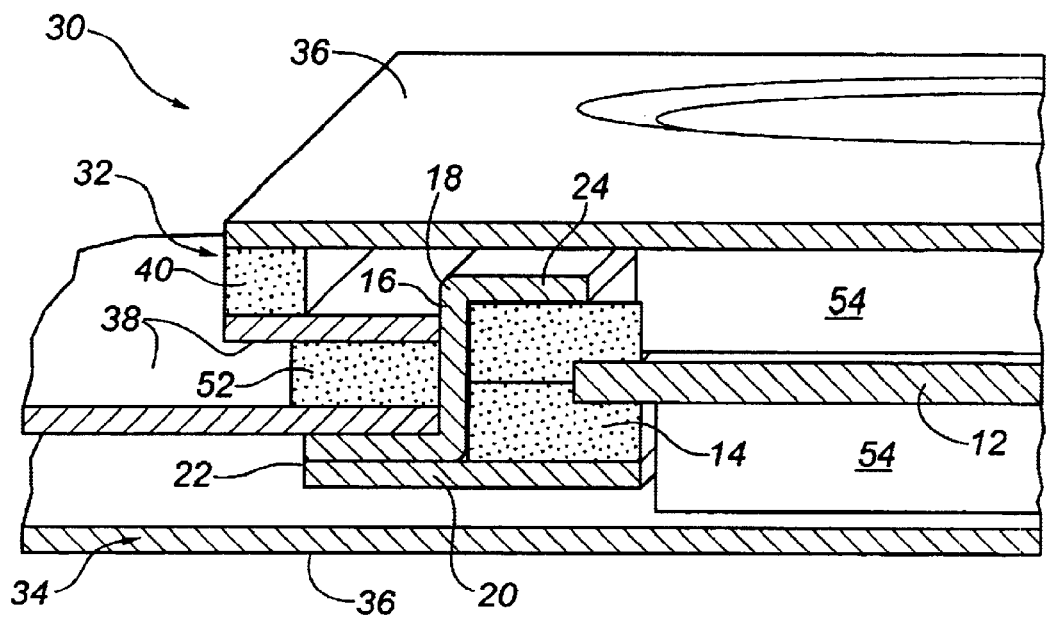
FIG. 4 shows a detailed cross sectional view of a pair of interconnects as they would be mated to form a single cell in the fuel stack.
Figure 5:
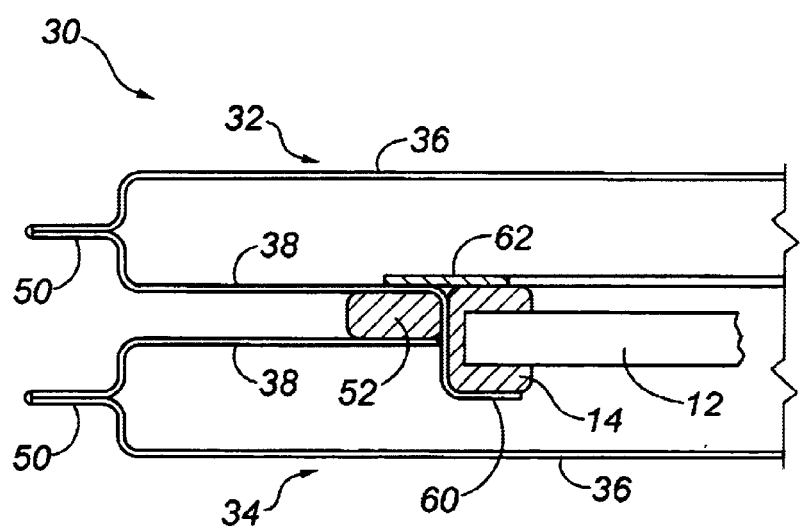
FIG. 5 shows a cross-section of an alternative embodiment of the present invention.

FIG. 4 shows a detailed cross-sectional view of a pair of interconnects as they would be mated to form a single fuel cell in a fuel cell stack. A single interconnect is formed from two plates joined at their edges. A solid plate forms the outside surface (36) and a solid inner plate (38) forms the surface facing the inner plate (38) of the mating interconnect. Any suitable means of edge sealing the outer and inner plates of the interconnect may be used. In one embodiment, the two plates (36, 38) are joined with a gasket seal (40) or an edge band around the periphery of the two plates. As depicted in FIG. 5, in an alternative embodiment, the two plates each comprise a joining flange (50) which are welded together. In any case, the edge of the interconnect must be substantially fluid-tight at the elevated operating temperature of the fuel cell stack.

In one embodiment, the interconnects (32 34) have generally rhomboid shapes to accommodate the circular intake and exhaust manifolds (42, 44, 46, 48), as shown in FIGS. 2 and 3. As shown, in a preferred embodiment the two interconnects are identical. When mated such that the inner plates (38) of the two interconnects are facing each other, and the major lateral edges are superimposed, each of the manifolds (42, 44, 46, 48) do not overlap with each other.

Each of the inner plates (38) has a cutout that is square in shape in the embodiment shown in the Figures. The cutout accommodates the fuel cell cassette (10) incorporating a ceramic fuel cell element (12) as described above. The cassette flange (22) is attached to an interior surface of the inner plate (38) of the lower interconnect (34) in a fluid-tight manner, such as by welding along the periphery of the flange (22). A gasket seal (52) is placed between the two inner plates around the cutout. The seal (52) abuts the frame (16) of the cassette holder (10) but does not necessarily seal against the frame (16). As long as seal (52) provides an effective seal between the two inner plates (38), gas will be contained with the fuel cell unit (30). The attachment of the frame (16) to one interconnect and the internal seal (14) of the cassette holder ensure that fuel and oxidant gases do not mix within the unit.

As shown in FIG. 4, in one embodiment, compressible, porous and electrically conductive members (54) may be placed against the fuel cell element and the solid plate of each interconnect. These members (54) may be comprised of an expanded metal such as Exmet™ or a nickel foam. The members (54) must be porous enough to provide adequate gas flow across the face of the electrode and provide good conductivity to collect electric current from the fuel cell element (12).

An alternative embodiment is illustrated in FIG. 5. A separate fuel cell cassette (10) is not used. Rather, the lower plate (38) of the upper interconnect (32) forms the fuel cell element (12) with a retaining clip (60). A separate frame member (62) is attached to the inside of the lower plate (38).

If the fuel cell units (30) are arrayed in a stack in parallel electrical connection, the electricity collected from the cell is conducted through the interconnect plates to tabs on the periphery (not shown) where wires or cables can be attached to carry the electricity to the load and away from the fuel cell stack. As the units (30) are stacked, electrical insulation must be provided between adjacent units. In one embodiment, the insulating material is a sheet of mica which also serves to slightly cushion the limits. Other materials that are electrically insulating and able to withstand the harsh environment of a fuel cell may be used. If the fuel cell units (30) are connected in series, the lower solid plate of one unit may be directly stacked on top of the upper solid plate of an adjacent unit. Alternatively, a thin sheet of a conducting material may separate adjacent units.

As will be apparent to those skilled in the art, various modifications, adaptations, and variations from the forgoing specific disclosure can be made without departing from the scope of the invention claimed herein.

What is claimed is:

1. A fuel cell unit comprising:
   (a) an upper interconnect comprising a top plate and a lower plate enclosing a sealed interior chamber and defining an intake and an exhaust manifold opening in fluid communication with the chamber, wherein the lower plate defines a cell opening;
   (b) a lower interconnect comprising a lower plate and an upper plate enclosing a sealed chamber defining an intake and an exhaust manifold opening in fluid communication with the chamber, wherein the upper plate defines a cell opening;
   (c) a fuel cell cassette comprising:
       (i) a single planar fuel cell element having an anode surface, a cathode surface and an edge surface;
       (ii) a resilient seal element which contacts both flat surfaces and the edge surface; and
       (iii) a frame that retains both the seal and the cell element; wherein the fuel cell cassette fits within the upper interconnect cell opening and mates with the upper interconnect to seal the upper chamber and the fuel cell cassette fits within the lower interconnect cell opening and mates with the lower interconnect to seal the lower chamber; and
   (d) seal means disposed between the upper and lower interconnects.

2. The fuel cell unit of claim 1 wherein the shape of each of the upper and lower interconnects is substantially rhomboidal, comprising a substantially square central portion and manifold portions which project outwards on opposing sides of the central portion.

3. The fuel cell unit of claim 1, wherein the fuel cell cassette frame comprises an upper portion and a lower portion which are joined together to retain the seal between the upper and lower portions.

4. The fuel cell unit of claim 1, wherein the joining of the upper and lower fuel cell frame portions of the cassette compresses an inner ring portion of the upper and lower seals against the ceramic cell element and an outer ring portion of the upper and lower seals against each other.

5. The fuel cell unit of claim 1 wherein the cassette has a seal that is made from a flexible, resilient material.

6. The fuel cell unit of claim 5 where the seal comprises a matrix of ceramic fibres.

7. The fuel cell unit of claim 6 wherein the ceramic fibres comprise alumina, zirconia, or combinations of both.

8. The fuel cell unit of claim 7 wherein the seal further comprises ceramic powder.

9. The fuel cell unit of claim 8 wherein the ceramic powder comprises alumina powder or zirconia powder or a combination of both.

10. The fuel cell unit of claim 2, wherein the upper interconnect and lower interconnect are substantially identical in shape.

11. A fuel cell stack comprising a stacked plurality of fuel cell units as claimed in claim 1.

* * * * *